(12) United States Patent
Gollamudi

(10) Patent No.: US 8,150,404 B2
(45) Date of Patent: Apr. 3, 2012

(54) METHODS FOR FREQUENCY-SELECTIVE PERSISTENT SCHEDULING

(75) Inventor: Sridhar Gollamudi, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 980 days.

(21) Appl. No.: 12/076,189

(22) Filed: Mar. 14, 2008

(65) Prior Publication Data

US 2008/0240034 A1  Oct. 2, 2008

Related U.S. Application Data

(60) Provisional application No. 60/918,803, filed on Mar. 19, 2007.

(51) Int. Cl.
  *H04W 72/00* (2009.01)
(52) U.S. Cl. ............... 455/450; 370/329; 370/395.4
(58) Field of Classification Search ............... 455/452.1; 370/330, 395.4, 436, 468
  See application file for complete search history.

(56) References Cited

U.S. PATENT DOCUMENTS

| | | | | |
|---|---|---|---|---|
| 6,026,082 | A * | 2/2000 | Astrin | 370/336 |
| 2006/0153112 | A1 * | 7/2006 | Lim et al. | 370/310 |
| 2007/0230412 | A1 | 10/2007 | McBeath et al. | |
| 2007/0254656 | A1 | 11/2007 | Dalsgaard | |
| 2007/0259672 | A1 | 11/2007 | Heo et al. | |
| 2007/0263568 | A1 | 11/2007 | Kim et al. | |
| 2007/0274288 | A1 | 11/2007 | Smith et al. | |
| 2008/0049690 | A1 * | 2/2008 | Kuchibhotla et al. | 370/338 |
| 2011/0065468 | A1 * | 3/2011 | Parkvall et al. | 455/509 |

OTHER PUBLICATIONS

International Search Report and Written Opinion dated Aug. 12, 2008.
Qualcomm Europe: "Considerations for control signaling support of Real Time Services R1-060173" 3GPP TSG-RAN WG1 LTE Ad Hoc, Jan. 23-25, 2006, pp. 1-5 XP-002490258 Helsinki (Finland).
Bachl, Rainer et al. "The Long Term Evolution Towards a New 3GPP Air Interface Standard". Bell Labs Technical Journal, Wiley, CA, US. vol. 11, No. 4, Jan. 1, 2007 pp., 25-51, XP-002490259.
Ericcson: "Persistent Scheduling for E-Ultra", TSG-RAN WG1 LTE AdHoc, Jan. 23-25, 2006, XP-002490260, Helinski (Finland).
NEC: "Persistent Scheduling and Dynamic Allocation R2-062788" 3GPP TSG-RAN WG2 #55, Oct. 9-13, 2006, XP-00240261, Seoul (Korea).
Nokia: "Uplink Scheduling for VoIP" 3GPP TSG-RAN WG2 Meeting #57, Feb. 12-16, 2007, XP-002490262 St. Louis, Missouri (USA).

* cited by examiner

*Primary Examiner* — Marcos Batista
(74) *Attorney, Agent, or Firm* — Harness, Dickey & Pierce, P.L.C.

(57) ABSTRACT

Methods for allocating wireless resources are provided. In one method, time domain resources are persistently allocated to a user for a data transmission during a transmission time interval, and frequency domain resources are dynamically allocated to the user for the data transmission during the transmission time interval. Methods provide flexibility for overbooking resources for any TTI to obtain statistical multiplexing gains.

13 Claims, 4 Drawing Sheets

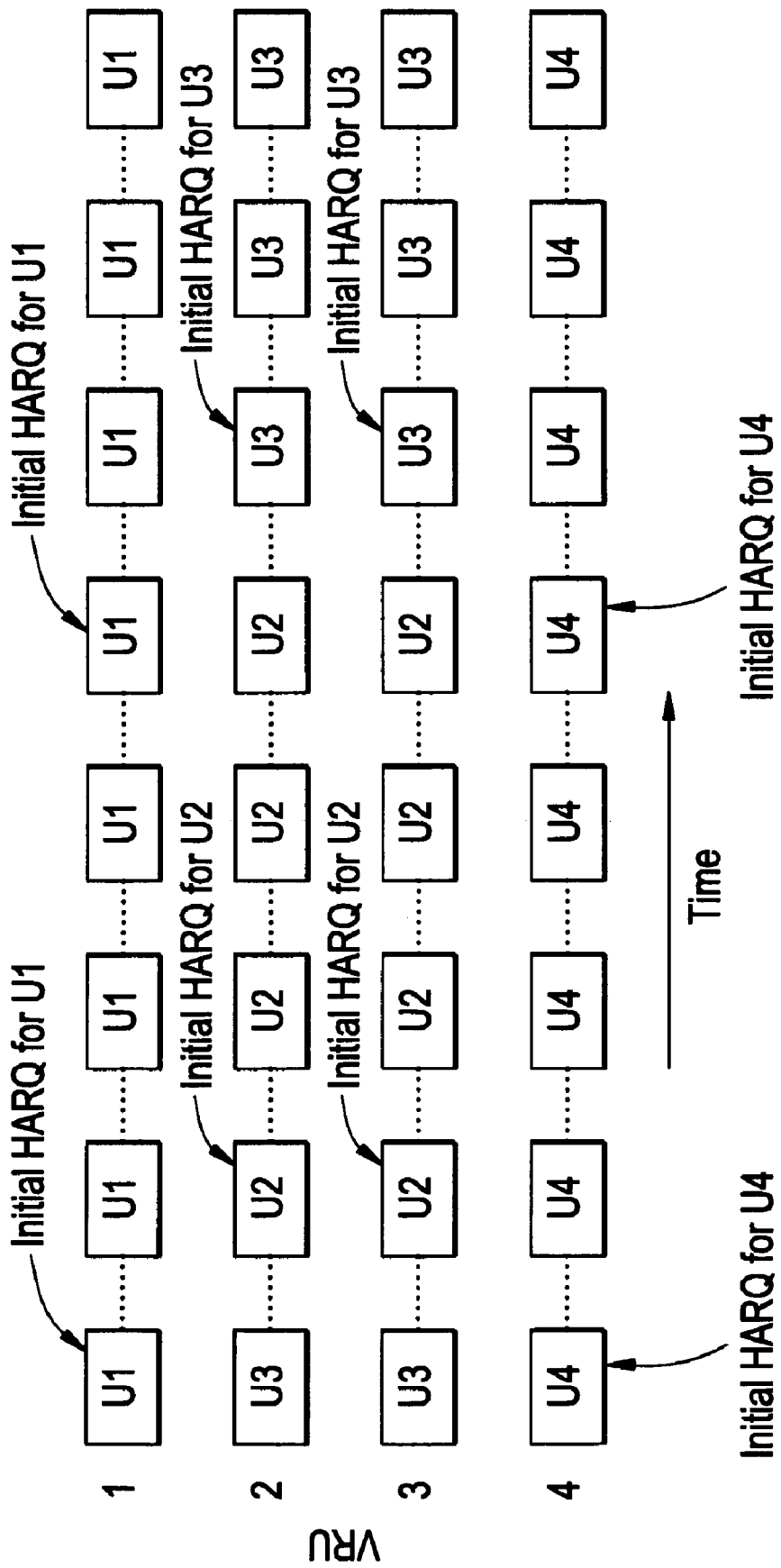

METHODS FOR FREQUENCY-SELECTIVE PERSISTENT SCHEDULING

PRIORITY STATEMENT

This non-provisional patent application claims priority under 35 U.S.C. §119(e) to provisional patent application Ser. No. 60/918,803, filed on Mar. 19, 2007, the entire contents of which are incorporated herein by reference.

BACKGROUND OF THE INVENTION

Description of the Conventional Art

In conventional cellular systems such as a Universal Mobile Telecommunications System Radio Access Network (UMTS RAN), time and frequency domain wireless resources for data transmission are allocated to users through dedicated signaling. Allocation of wireless resources to users is also referred to as scheduling.

Voice over Internet Protocol (VoIP) transmission over wireless cellular systems, for example, utilizes three different well-known scheduling mechanisms to allocate time and frequency resources to users in the uplink (from user to base station). These mechanisms include: persistent scheduling, persistent scheduling with grouping, and dynamic scheduling.

Pure persistent scheduling is limited in that bandwidth is wasted due to voids in persistently allocated resources. In most cases, the voids are caused by early hybrid automatic repeat request (HARQ) termination. This limitation may be overcome by using persistent scheduling with grouping in which users are statistically multiplexed with the help of a mapping of bits or bitmap. However, persistent allocation with grouping does not allow efficient sharing of resources among different groups.

Pure dynamic scheduling may reduce the average number of HARQ retransmissions for VoIP packets and improve capacity by allowing channel peak selection in both time and frequency domains. In doing so, however, the requisite control overhead increases.

SUMMARY OF THE INVENTION

Illustrative embodiments provide methods for frequency selective persistent scheduling in which time domain resources are allocated persistently (semi-statically), while frequency domain resources are allocated dynamically based on channel conditions.

Illustrative embodiments enable simpler persistent allocation of time resources with performance gains from channel-sensitive frequency resource allocation and statistical multiplexing gains similar to those obtained from a conventional grouping approach. Utilizing illustrative embodiments, benefits resulting from combining different approaches may be obtained at the cost of a relatively modest downlink control signal overhead.

Moreover, illustrative embodiments provide flexibility for overbooking resources for any transmission time interval (TTI) to obtain statistical multiplexing gains. Statistical multiplexing gains may lead to reduced occurrences of transmission voids and allow the network to control the trade-off between the number of retransmissions per user and the number of supported users.

According to at least one illustrative embodiment, time domain resources are persistently allocated to a user for a data transmission during a transmission time interval, and frequency domain resources are dynamically allocated to the user for the data transmission during the transmission time interval.

According to another exemplary embodiment, time domain resources are semi-statically assigned to users scheduled for transmission in a transmission time interval. The time-domain resources are assigned on a per transmission time interval basis. Frequency domain resources are dynamically assigned to users scheduled for transmission in each transmission time interval.

According to another illustrative embodiment, at least one virtual resource unit is assigned to a user. The virtual resource unit identifier is indicative of frequency resources available to the user during a next transmission time interval, and each assigned virtual resource unit identifier maps to a physical resource unit for transmission during the next transmission time interval. A physical resource unit is then mapped to each virtual resource unit assigned to the user. The mapping of the physical resource unit establishes a physical location of the block of multiplexed sub-carriers in the carrier spectrum.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 4 is an example of persistently allocated time domain resources according to an illustrative embodiment.

DETAILED DESCRIPTION OF THE EMBODIMENTS

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more digital signal processors (DSPs), application-specific-integrated-circuits, field programmable gate arrays (FPGAs) computers or the like.

Figure 1:
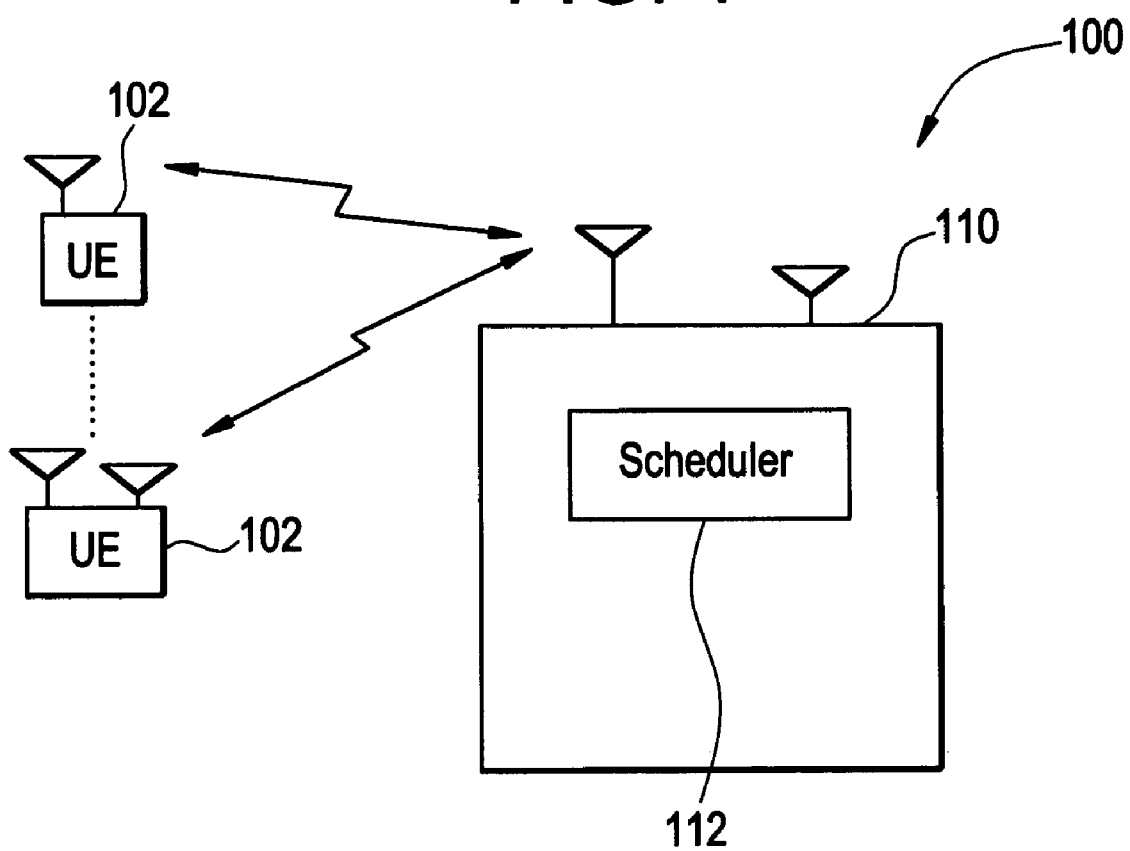
FIG. 1 illustrates a cell of a wireless communications system according to an illustrative embodiment.

FIG. 1 illustrates a cell 100 of a wireless communication system according to an illustrative embodiment. Examples of the wireless communication system shown in FIG. 1 include, but are not limited to, Universal Mobile Telecommunications System (UMTS) networks, Evolved Universal Terrestrial Radio Access (E-UTRA) networks, Evolved High Rate Packet Data (E-HRPD) networks, WiMAX, and other orthogonal frequency division multiplexing (OFDM) or single carrier frequency division multiple access (SC-FDMA) based networks.

Referring to FIG. 1, the cell 100 includes a base station 110 providing wireless communication services including voice and/or data service to user equipments (UEs) or users 102 over corresponding regions or cellular areas. The base station 110 includes a scheduler 112 for scheduling a plurality of users for transmission by allocating wireless resources among the plurality of users 102. The manner in which the scheduler 112 schedules users for transmission will be described in more detail below.

Where used below the terms base station, base transceiver station (BTS) and NodeB are synonymous and may be used interchangeably to describe equipment that provides data connectivity between a wireless network and one or more UEs. Additionally where used below, the terms user, user equipment (UE), subscriber, mobile station and remote station are synonymous and may be used interchangeably to describe a remote user of wireless resources in a wireless communication network.

Illustrative embodiments provide methods for scheduling a plurality of users for transmission in the uplink (from user to base station). The scheduling methods described herein are persistent in time, but dynamic in frequency for one or more transmission time intervals (TTIs).

Figure 2:
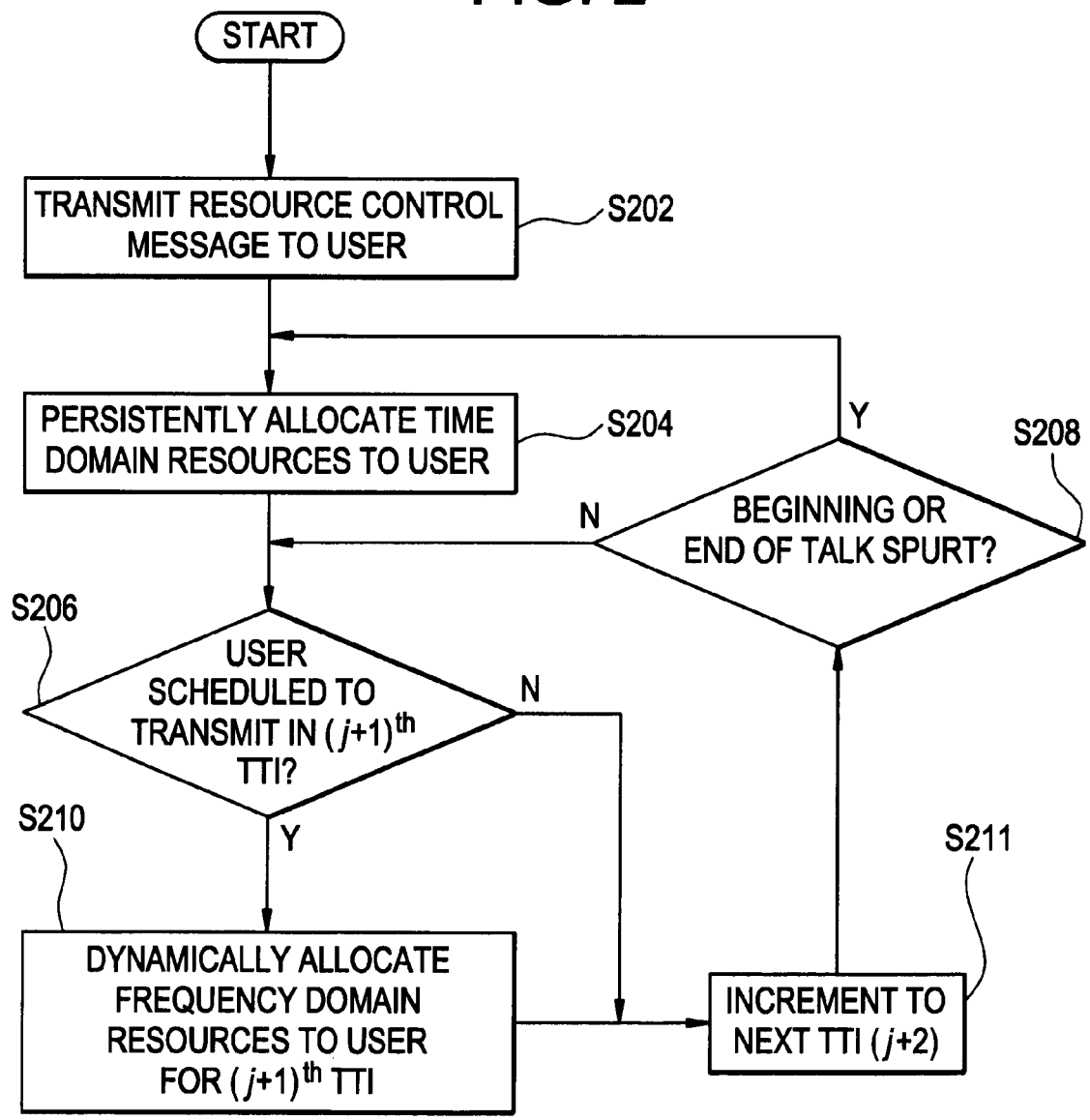
FIG. 2 is a flow chart illustrating a method for scheduling a plurality of users for simultaneous transmission according to an illustrative embodiment.

FIG. 2 is a flow chart illustrating a scheduling method according to an illustrative embodiment. The method shown in FIG. 2 will be described with regard to the cell 100 shown in FIG. 1, in particular with respect to functions/acts being performed by the base station 110 and/or scheduler 112. Because scheduling entities such as scheduler 112 are well-known in the art, a detailed discussion of the components of the scheduler 112 will be omitted for the sake of brevity.

Moreover, it should be noted that the exemplary embodiments shown and described herein are meant to be illustrative only and not limiting in any way. For example, it will be understood that the present invention is applicable to any system that provides orthogonal channel resources separated in frequency.

In some instances, the method will be described with respect to a single user 102. However, it will be understood that the interactions/functions/acts between the base station 110 and/or scheduler 112 and each of a plurality of users to be scheduled for transmission may be the same so as to simultaneously allocate wireless resources to the plurality of users for data transmission in the uplink.

Referring to FIG. 2, at step S202, prior to sending a persistent allocation message to a user, the network (e.g., via scheduler 112 within base station 110) transmits an initial radio resource control (RRC) message to the user 102. The RRC message establishes a table of allowed modulation and coding schemes (MCS) for uplink transmission. In response to the RRC message, the user 102 switches to a persistent allocation mode. Because RRC messages and the manner in which this occurs are well-known, a detailed discussion will be omitted.

At step S204, the base station 110 persistently allocates time domain resources to the user 102. To do so, the base station 110 transmits a persistent allocation message to the user 102 using RRC or medium access control (MAC) signaling. If MAC signaling is used, then the scheduler 112 sends the persistent allocation message, whereas if RRC signaling is used for persistent allocation, an RRC entity (not shown) within the base station 110 initiates the persistent allocation message.

Regardless of the signaling scheme used, the persistent allocation message identifies the MCS scheme within the established (e.g., pre-established) table of MCS levels. The persistent allocation message also establishes (e.g., pre-establishes) a set of virtual frequency resources (as described below) and the periodicity of the persistent allocation of time resources.

According to illustrative embodiments, the persistent allocation of time resources may be performed in a manner similar or substantially similar to the manner in which time and frequency resources are allocated in the conventional persistent allocation scheme, except that a resource unit identifier, referred to herein as a virtual resource identifier (VRU), replaces each physical resource unit (PRU) within the persistent resource allocation message.

As is well-known in the art, a PRU is a block of orthogonal frequency-division multiplexed OFDM sub-carriers that may be allocated to a user. The block of OFDM sub-carriers is specified by the location of the block in the frequency spectrum of the carrier. As discussed herein, a VRU refers to a block of OFDM sub-carriers whose physical location in the carrier spectrum is not determined a prior. Instead of having a physical location determined a priori, each block of OFDM sub-carriers that constitutes a VRU has an assigned unique identifier. A unique identifier is a label that is unique to each VRU in the carrier bandwidth. The VRUs are mapped to PRUs to allocate frequency resources, as will be discussed in more detail below.

The periodicity of persistent allocation messages depends on the type of transmission frame for which the time domain resources are being allocated (e.g., whether the transmissions are voice frame(s) or silence indicator (SID) frame(s)), the desired amount of frame bundling, and the target number of HARQ transmissions. A persistent allocation message is valid for all subsequent TTIs, until another persistent allocation message is transmitted to the user.

The base station 110 may transmit persistent resource allocation messages to users 102 at the beginning and/or end of each talk spurt to allocate an appropriate amount of resources for transmitting data (e.g., VoIP) frames and SID frames, respectively. As is well-known in the art, a "talk spurt" refers to a sequence of voice frames that are generated by a speaker between pauses in speech. Pauses in speech are referred to as silence periods, during which time small control signals called SID frames are transmitted intermittently.

Figure 3:
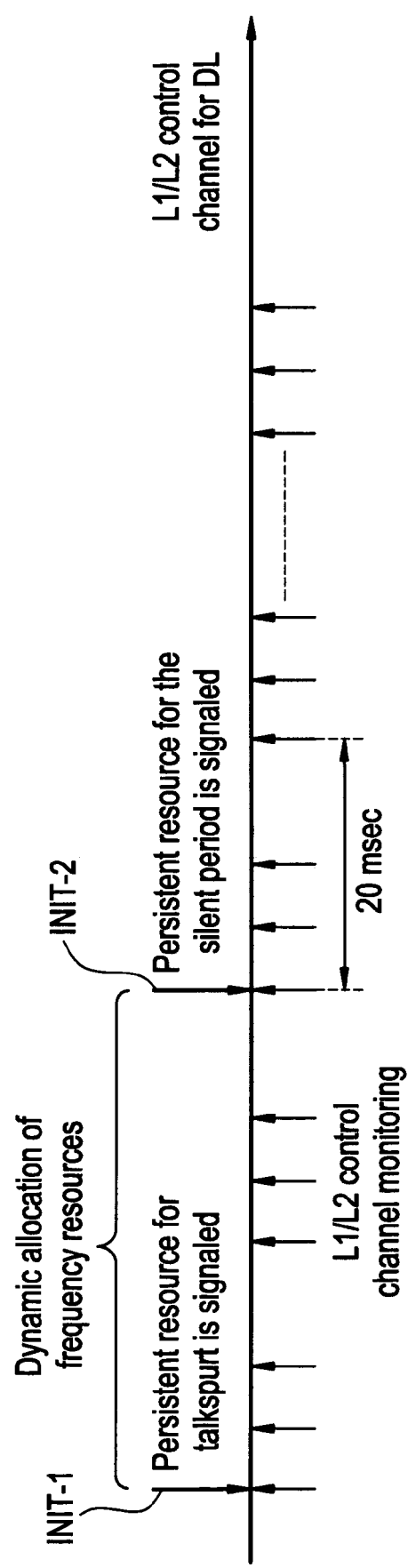
FIG. 3 illustrates example transmission timing for persistent allocation messages in the uplink.

FIG. 3 illustrates example transmission timing for persistent resource allocation messages in the uplink. As shown, a persistent resource allocation message is transmitted at the beginning and end of the talk spurt. The transmission of the persistent resource allocation message at the end of the talk spurt also constitutes a transmission of the persistent resource allocation message at the beginning of the silent period.

Table 1 shows example content of a persistent resource allocation message transmitted from the base station 110 to a user 102 along with examples of the number of bits required for the payload using typical VoIP assumptions.

TABLE 1

| Field | # of bits |
| --- | --- |
| Initial VRU | 4 |
| Index | 2-3 |
| Periodicity of Packets | 3 |
| TTI Number for Transmission of First Packet | 0 |
| Restricted Resource Unit Set Identifier | 1-2 |
| CRC with UE ID Scrambling | 16 |
| Total Payload | 26-28 |

Referring to Table 1, the 'Index' refers to an index of the pre-configured table of MCS levels received by the users 102 in the above-discussed RRC messages. The 'periodicity of packets' refers to the time between successive initial HARQ transmissions, and is indicative of the time between TTIs in which the particular user is scheduled to transmit. The periodicity of packets may be, for example, 20 ms, 40 ms, 60 ms, 80 ms, 160 ms. Referring again to FIG. 3, for example, if the periodicity of packets is 160 ms, then each of INIT_1 and INIT_2 represent initial HARQ transmissions.

In addition to conveying the time between successive initial HARQ transmissions, the periodicity of packets implicitly specifies whether the current transmission is a SID frame transmission and the amount of bundling for voice transmissions. For example, a periodicity of 160 ms implies SID frame transmissions, a periodicity of 20 ms implies voice frame transmission without bundling, a periodicity of 40 ms implies voice frame transmission with 2-frame bundling, and so on.

Referring still to Table 1, the persistent allocation message also indicates the TTI during which the user 102 is permitted to transmit. Such an indication is implicitly derived by the user 102 based on the timing of the persistence allocation message. For example, if a user receives the persistent allocation during the $j^{th}$ TTI (where j is an integer)—which specifies the periodicity of allocation to be N TTIs (where N is an integer)—then the user 102 implicitly determines that the persistent allocation is applicable for TTI numbers j+1, j+N+1, j+2N+1, and so on.

Still referring to Table 1, the 'Restricted Resource Unit Set Identifier' identifies the set of PRUs that the user is allowed to use in the designated TTI (e.g., the $(j+1)^{th}$ TTI in the above example). For example, if the total number of usable PRUs within the $(j+1)^{th}$ TTI is 21, then the PRUs may be partitioned into 3 subsets of 7 PRUs, where each of the PRUs in a subset are interlaced in frequency. The scheduler 112 allocates one of the three subsets of PRUs to the user using the 'Restricted Resource Unit Set Identifier'. Accordingly, in the $(j+1)^{th}$ TTI, for example, the user 102 may be dynamically allocated PRUs only from this specified subset.

In illustrative embodiments, for a given or current TTI, the scheduler 112 allocates a contiguous set of VRUs to users—as described in detail below with respect to FIG. 4—instead of a contiguous set of PRUs as in the conventional art. The starting VRU specifies the first VRU in the set of contiguous VRUs. The starting VRU along with the Index (or MCS specification) identifies the set of VRUs allocated to the user since the MCS determines the number of resource units for the allocation. When the VRU is mapped to a PRU (e.g., by subsequent dynamic grants), then the set of PRUs for the allocation is determined as the set of N consecutive PRUs starting at the specified, initial PRU, where N is the number of resource units specified by the MCS.

According to exemplary embodiments, no two users can be allocated the same VRU and the same restricted resource unit set in the same TTI. Although other suitable algorithms may be used to allocate time resources and virtual resource units to users, a relatively simple example will be discussed below with respect to FIG. 4.

FIG. 4 illustrates an example allocation of VRUs for one restricted resource unit set. In FIG. 4, the horizontal axis is time and the vertical axis represents VRU numbers, which are used in place of PRUs that would otherwise be used for conventional persistent allocation.

Referring to FIG. 4, the starting VRU for each user who is assigned VRUs (n, n+1, ... n+M−1) is n, where n represents the smallest VRU in the user's allocation and M represents the number of VRUs assigned to the user. Each of n and M are integers.

Referring to FIG. 4, user U1 is assigned an initial VRU 1, each of users U2 and U3 are assigned initial VRUs 2 and 3, user U4 is assigned initial VRU 4, and so on.

Allocating persistent resources in this manner ensures that the VRUs assigned to all users that share the same restricted resource unit set in a TTI are unique and facilitates unambiguous signaling of dynamic frequency allocation. In methods according to illustrative embodiments, a user's allocated VRUs remain unchanged for subsequent TTIs, until another persistent resource allocation message is sent to the user. In other words, the time domain resource allocation recurs for subsequent TTIs in which the user is allowed to transmit.

Moreover, a user's starting VRU is not a unique identifier of the user in the cell or within the set of users that share the same restricted resource unit set. With respect to FIG. 4, for example, users U2 and U3 may share the same VRUs 2 and 3, but cannot then share the same restricted resource unit set in the same TTI. The mapping of VRUs to PRUs will be described in detail with reference to FIG. 2.

Returning to FIG. 2, as discussed above, the scheduler 112 persistently allocates time resources to the user 102 at step S204. The persistent allocation of time resources by the scheduler 112 indicates a sequence of upcoming transmission times (e.g., the j+1, j+N+1, j+2N+1 ... sequence of TTI's in the above example) for the user 102. In other words, after the scheduler 112 persistently allocates time resources to the user 102, the user 102 knows when (e.g., during which TTIs) to transmit.

At step S206, the scheduler 112 determines if the user 102 is scheduled to transmit during the next TI (e.g., j+1 in the above example).

If the user 102 is scheduled to transmit during the next TTI, the scheduler 112 dynamically allocates frequency resources to the user 102 at step S210. The scheduler 112 allocates the frequency resources by allocating PRUs to the user 102. The scheduler 112 allocates PRUs to the user 102 by mapping each assigned VRU to a unique PRU, thereby mapping the starting VRU of the user 102 (specified in the user's persistent allocation message) to a unique PRU for the next TTI (e.g., the $(j+1)^{th}$ TTI).

For example, if the scheduler 112 maps VRU_1 to PRU_3, VRU_2 to PRU_4, VRU_3 to PRU_2 and VRU_4 to PRU_1 in a given TTI, then a user whose starting VRU is VRU_3 and whose number of PRUs (e.g., specified by the MCS) is 2 is allocated PRUs PRU_2 and PRU_3, where PRU_2 corresponds to starting VRU_3.

The number of ways in which the VRUs are mapped to PRUs in a given TTI may be determined based on the number of VRUs and PRUs available for a given TTI. For example, if the number of PRUs in a restricted resource unit set is K, then the number of ways in which K PRUs may be assigned to $K_{max}$ VRUs (with only ($K_{max}$−K) number of VRUs not being assigned) is given by $P_K^{K_{max}}$, where $P_K^{K_{max}}$ is the number of permutations of a string of length K from $K_{max}$ number of elements. In this example, K and $K_{max}$ are integers.

If $K_{max}$=9 and K=7, then 18 bits per restricted resource unit set in one TTI (or 54 total bits) are needed to allocate frequency domain resources to all users scheduled for transmission in the TTI. After CRC attachment of 16 bits, this corresponds to a signaling message of about 70 bits per TTI.

The persistent assigning of only VRUs, but not PRUs, to users allows PRUs to be allocated dynamically within each TTI. That is, frequency resources may be dynamically assigned to users within a given TTI.

The scheduler 112 may use information from channel sounding reference signals (CS-RS) to determine the allocation of PRUs to scheduled users in a given TTI. Because these signals, information and the manner in which the signals and information is used are well known, a detailed description will be omitted.

Still referring to step S210 in FIG. 2, after performing the PRU/VRU mapping, the mappings may then be signaled to the user 102 individually or jointly with other users using $\lceil \log_2 P_K^{K_{max}} \rceil$ bits to dynamically allocate frequency resources to the users scheduled to transmit in the next TTI. The mappings may be signaled to the user over any suitable signaling channel.

Once the scheduler 112 has allocated frequency resources at step S210, the user 102 may transmit data in the uplink using its allocated wireless resources.

At step S211, the TTI number increments to the next TTI (j+2).

At step S208, for the new TTI (j+2), the scheduler 112 determines if a new persistent allocation message should be transmitted to the user 102. As discussed above, the scheduler 112 may transmit a new persistent allocation at the beginning and/or end of each talk spurt. Accordingly, the scheduler 112 determines if a new persistent allocation message should be transmitted based on whether the next TTI is the beginning or end of a talk spurt for the user 102. If the next TTI is the beginning or end of a talk spurt for the user 102, then the scheduler 112 determines that a new persistent allocation message should be transmitted. Otherwise, the scheduler 112 determines that a new persistent allocation message should not be transmitted.

If the scheduler 112 determines that a new persistent allocation message should be transmitted to user 102, the process returns to step S204 and continues as discussed above.

Returning to step S208, if the scheduler 112 determines that a new persistent allocation message is not necessary in the new TTI (j+2), the process proceeds to step S206 to check if the user is scheduled for the new TTI (j+2), as discussed above. The method then proceeds from step S206 as described above.

Returning to step S206 of FIG. 2, if the scheduler 112 determines that the user 102 is not scheduled to transmit during the next TTI (j+2), the process proceeds to step S211 and continues as discussed above.

In the examples described herein, the $K_{max}$ number of VRUs is larger than the K number of PRUs in a restricted resource unit set. Accordingly, if all users have data to transmit during a given TTI, more users are scheduled for transmission in a TTI than the available PRUs can support. This is referred to as resource overbooking.

In most TTIs, at least a portion of users scheduled to transmit often transmit nothing because of early HARQ termination. The scheduler 112 may utilize these unused persistent allocation resources by "overbooking" resources available for persistent allocations. According to at least this illustrative embodiment, the scheduler 112 may persistently allocate more frequency resources than are physically available.

For example, if the number of PRUs is 6 and the number of VRUs is 8, then the scheduler 112 assigns 8 resource units to users while there are actually only 6 resource units available in a TTI. At the time that the scheduler 112 determines the VRU-to-PRU mapping, the scheduler 112 knows which of these 8 allocated VRUs is not needed (e.g., will be unused) due to early HARQ termination. Based on this knowledge, the scheduler 112 then chooses a mapping that maps each of the 6 PRUs only to those VRUs that will actually be used in that TTI.

Resource overbooking also implies that the actual number of PRUs may be smaller than that required for all scheduled transmissions in a TTI when the number of transmission voids due to early termination in a TTI is smaller than the amount of resource overbooking for the same TTI. In this case, a portion of the scheduled transmissions may need to be cancelled, thereby reducing the available number of HARQ transmission attempts for the cancelled users. Signaling of cancellations is automatically achieved from the design of the dynamic frequency allocation described above, where K number of PRUs are assigned to less than or equal to $K_{max}$ VRUs.

Resource overbooking also decreases the effective number of available HARQ transmissions for selected users and utilizes bandwidth conservation to support a larger number of users. For example, consider the case where all users in a cell have each been allocated 4 HARQ transmissions for every voice frame of duration 20 ms. In other words, persistent resources are allocated to each user in 4 TTIs within 20 ms. In this example, each user is (persistently) scheduled to transmit in one TTI every 5 ms. If overbooking is used, the total number of persistently allocated VRUs in any TTI may be larger than the total number of available PRUs.

In this example, because the total number of persistently allocated VRUs in any TTI is larger than the total number of available PRUs, resource conflicts occur when all users scheduled to transmit in a TTI have data to transmit. In response to the resource conflicts, the scheduler 112 cancels transmissions of a portion of the users in the TTI by choosing a VRU-PRU mapping that results in the VRUs allocated to the canceled users not to be mapped to valid PRUs.

Alternatively, however, if the scheduler 112 determines that a certain set of scheduled users require, for example, only 3 HARQ transmissions instead of 4 for each voice frame, then the scheduler 112 may cancel the fourth HARQ transmission of users not needing the fourth transmission in the event of a resource conflict. In this example, the scheduler 112 may support a larger number of persistently allocated users by reducing the number of HARQ transmissions made available to a subset of users.

The ability to redistribute the number of retransmissions for users to increase the total number of users is possible only with dynamic allocation of frequency resources as described herein.

Illustrative embodiments provide an uplink scheduling scheme combining features of persistent, dynamic and grouping-based scheduling to provide channel sensitive scheduling gain in the frequency domain, statistical multiplexing gain to fill up transmission voids caused by early HARQ termination, ability to increase the total number of VoIP users by statistically reducing the number of available HARQ retransmissions for selected users, and a relatively modest increase in L1/L2 downlink control signaling.

Instead of semi-statically allocating both time and frequency resources as in pure persistent scheduling, example embodiments allocate only time resources to a VoIP user semi-statically, without specifying in the persistent allocation message what resource units (RUs) to use for the transmissions.

Illustrative embodiments may be embodied in the form of a computer readable medium storing computer executable instructions, which when executed cause a computer to perform a method according to illustrative embodiments discussed herein.

The invention being thus described, it will be obvious that the same may be varied in many ways. Such variations are not to be regarded as a departure from the invention, and all such modifications are intended to be included within the scope of the invention.

I claim:

1. A method for allocating wireless resources to a user scheduled for transmission in a wireless network, the method comprising:

persistently allocating time domain resources to the user for data transmission during a transmission time interval, the persistently allocating including,
assigning at least one virtual resource unit identifier to the user, the at least one virtual resource unit identifier being indicative of a block of multiplexed sub-carriers available to the user during the transmission time interval, wherein a physical location of the block of multiplexed sub-carriers in a carrier spectrum is undetermined when the at least one virtual resource unit identifier is assigned to the user; and
dynamically allocating frequency domain resources to the user for the data transmission during the transmission time interval.

2. The method of claim 1, wherein the persistently allocating comprises:
transmitting a persistent allocation message to the user, the persistent allocation message identifying the transmission time interval during which the user is to transmit, and indicating a periodicity with which subsequent persistent allocation messages will be transmitted.

3. The method of claim 2, wherein the transmission time interval during which the user is to transmit is indicated implicitly based on the transmission time interval during which the persistent allocation message is transmitted.

4. The method of claim 3, wherein the transmission time interval during which the user is to transmit is a next transmission time interval after transmission of the persistent allocation message.

5. The method of claim 1, further comprising:
determining whether to re-allocate time domain resources to the user.

6. The method of claim 1, wherein each of the assigned at least one virtual resource unit identifiers maps to a physical resource unit for transmission during the transmission time interval.

7. The method of claim 6, wherein the dynamically allocating comprises:
mapping a physical resource unit to each of the at least one virtual resource unit identifiers assigned to the user, the mapping of the physical resource unit establishing the physical location of the block of multiplexed sub-carriers in the carrier spectrum.

8. The method of claim 6, wherein the frequency resources are dynamically allocated by mapping a physical resource unit to each of the at least one virtual resource unit identifiers assigned to the user.

9. The method of claim 1, wherein the persistently allocating comprises:
semi-statically allocating time domain resources to the user for the data transmission.

10. The method of claim 1, wherein the frequency resources are dynamically allocated based on channel conditions.

11. The method of claim 1, further comprising:
transmitting an initial resource identification message identifying candidate modulation and coding scheme levels to the user for the scheduled transmission.

12. A method for allocating wireless resources in a wireless network, the method comprising:
semi-statically assigning time domain resources to users scheduled for transmission in a transmission time interval, the time-domain resources being assigned on a per transmission time interval basis;
assigning virtual resource unit identifiers to the users, each of the virtual resource unit identifiers being indicative of a block of multiplexed sub-carriers available to a user during the transmission time interval, wherein a physical location of the block of multiplexed sub-carriers in a carrier spectrum is undetermined when the virtual resource unit identifiers are assigned to the users; and
dynamically assigning frequency domain resources to the users scheduled for transmission in the transmission time interval.

13. A method for allocating wireless resources in a wireless network, the method comprising:
assigning at least one virtual resource unit identifier to a user, the at least one virtual resource unit identifier being indicative of a block of multiplexed sub-carriers available to the user during a next transmission time interval, wherein a physical location of the block of multiplexed sub-carriers in a carrier spectrum is undetermined when the at least one virtual resource unit identifier is assigned to the user, and each assigned virtual resource unit identifier maps to a physical resource unit for transmission during the next transmission time interval; and
mapping a physical resource unit to each of the at least one virtual resource unit identifiers assigned to the user, the mapping of the physical resource unit establishing the physical location of the block of multiplexed sub-carriers in the carrier spectrum.

* * * * *